United States Patent [19]
Winston

[11] 3,923,381
[45] Dec. 2, 1975

[54] RADIANT ENERGY COLLECTION
[75] Inventor: Roland Winston, Chicago, Ill.
[73] Assignee: The University of Chicago, Chicago, Ill.
[22] Filed: Dec. 28, 1973
[21] Appl. No.: 429,161

[52] U.S. Cl. .................. 350/293; 126/271; 350/294
[51] Int. Cl. ............................................. G02b 5/10
[58] Field of Search ........ 126/270, 271; 331/94.5 P; 350/288, 293, 294, 299, 310, 190

[56] References Cited
UNITED STATES PATENTS
980,505  1/1911  Emmet ............................... 126/271

Primary Examiner—Alfred E. Smith
Assistant Examiner—Michael J. Tokar
Attorney, Agent, or Firm—Merriam, Marshall, Shapiro & Klose

[57] ABSTRACT

Disclosed are non-imaging systems and devices for collection and concentration of electromagnetic energy and particularly solar energy including one or more longitudinally-extending, generally trough-shaped bodies having curving inner reflective walls for concentration of energy from a relatively large entrance aperture toward a relatively small exit aperture. Solar energy concentrators of the invention include energy traps and collect and concentrate substantial amounts of direct solar energy, even at solstice, without substantial diurnal tracking.

24 Claims, 19 Drawing Figures

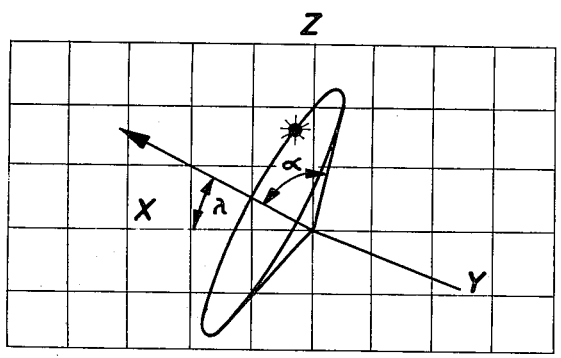
FIG.12
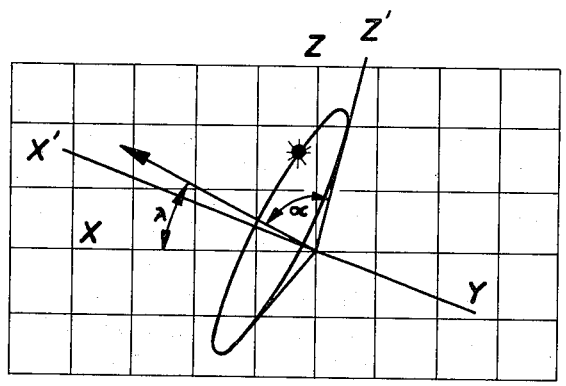
FIG.13
FIG.14
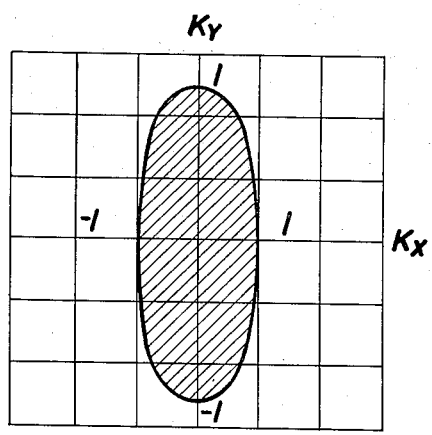
FIG.15
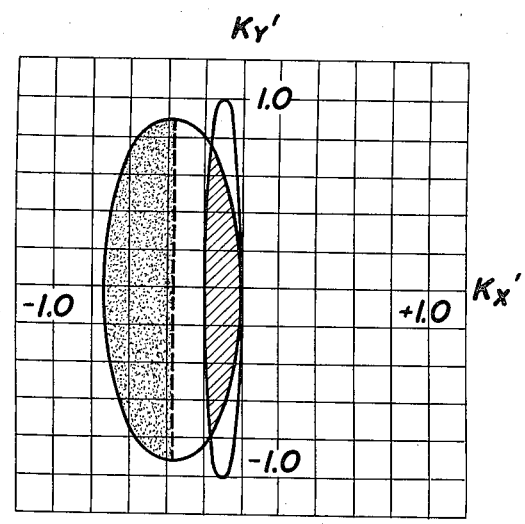

FIG. 17
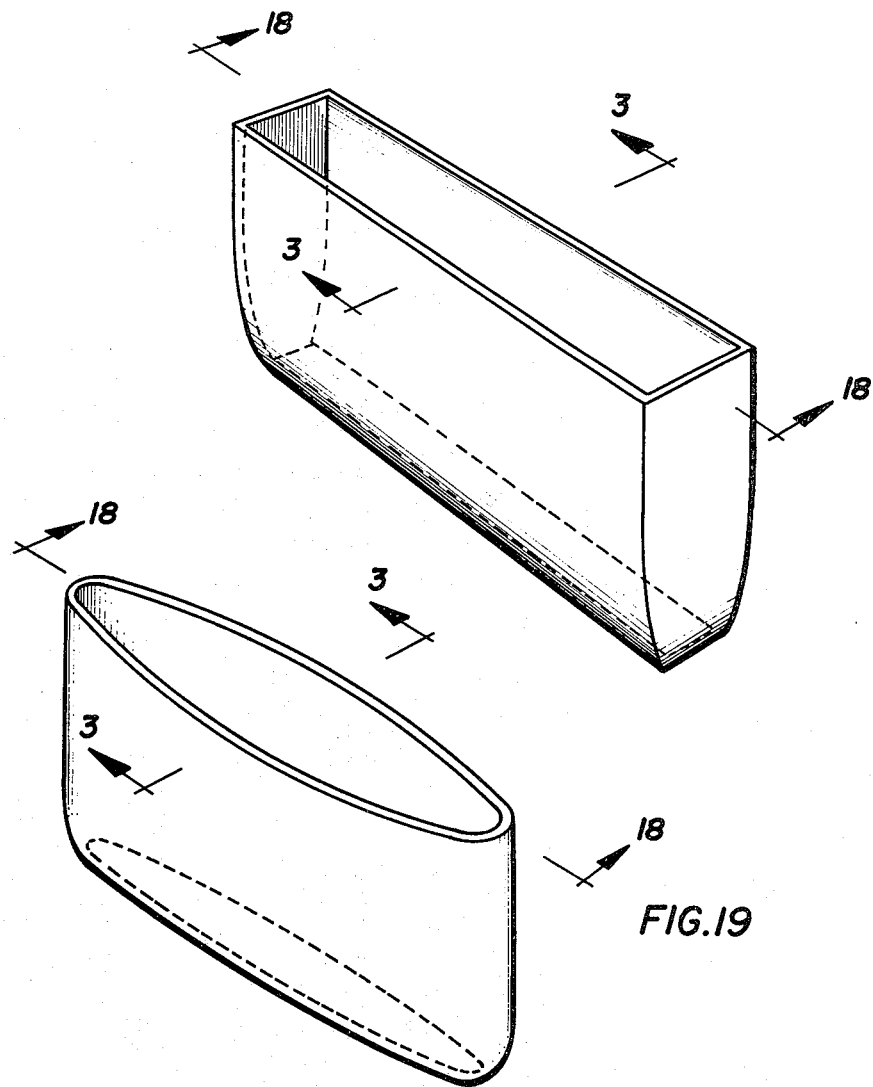
FIG. 19
FIG. 18
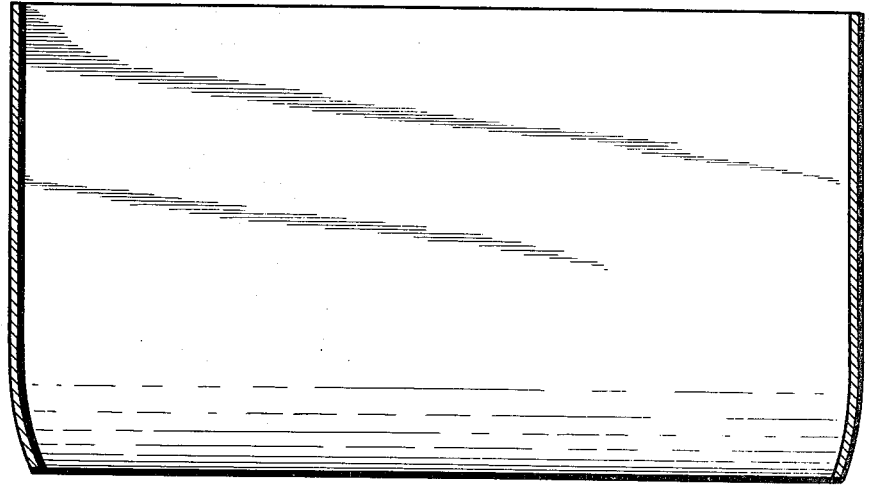

RADIANT ENERGY COLLECTION

BACKGROUND OF THE INVENTION

The present invention relates generally to electromagnetic energy collection and more particularly to devices useful in the collection and utilization of radiant energy from solar and other sources.

The prior art has proposed numerous devices for detection of electromagnetic energy (e.g., infrared scanners, detectors of light from high energy particles, and the like) and for collection of such energy (e.g., microwave antennas, solar collectors, and the like) and is particularly rich in suggestions of systems for collection and utilization of solar energy.

Notwithstanding the voluminous proposals of the art, among the basic, and as yet inadequately resolved, problems inherent in the efficient utilization of solar energy are avoidance of energy loss through re-radiation (i.e., energy conservation) and avoidance of intricate, and hence costly, apparatus for tracking the sun in its apparent daily motion through the celestial sphere.

A typical attempt to solve solar energy conservation problems involves providing coatings on energy absorbing surfaces as well as elaborate insulation of the particular "trap" employed for the utilization of collected energy. U.S. Pat. No. 3,277,884, for example, illustrates such a scheme.

Another common manner of dealing with energy conservation involves including in the collection scheme reflective or refractive concentration apparatus to permit collection of solar energy impinging upon a relatively large area and focusing of collected energy toward a relatively small area of utilization. Typical schemes proposing use of reflector concentrators are illustrated in U.S. Pat. Nos. 1,814,897, 3,200,820 and 3,217,702, for example. ("Shadowing" effects encountered in disposing an energy utilization body in path of sunlight impinging upon reflectors are to some extent avoided through use of off-axis reflectors, as in U.S. Pat. Nos. 3,052,229, 3,613,659 and Tabor, "Stationary Mirror Systems for Solar Collectors" *Solar Energy*, Vol. II, No. 3–4, pp. 27 et seq. (1958)). Typical lens systems for solar concentration are illustrated in U.S. Pat. No. 3,125,091 and Meinel et al., "Physics Looks at Solar Energy" *Physics Today*, Vol. 25, pp. 684 et seq. (1972). All of the mirroring and lens systems proposed above are basically imaging systems wherein solar energy is reflected or refracted to a system focal point at which the "concentrated" energy is utilized for heating or power generation.

Among the solutions proposed for avoidance of diurnal solar tracking is the provision of huge, but marginally efficient, mirrored surfaces such as shown in U.S. Pat. No. 3,179,105.

None of the prior art systems has adequately solved the problems of energy conservation and solar tracking and, to a degree, solution of one problem often tends to enlarge the difficulties posed by the other. This is to say that systems permitting solar concentration by large factors generally will require the most careful and frequent diurnal adjustments for solar tracking. Conversely, systems requiring little or no diurnal adjustment generally provide lowest factors of concentration. Thus, Tabor, infra concludes that the maximum concentration available in a stationary system (i.e., one requiring only seasonal solar tracking) is on the order of 3 or 4.

Non-imaging light funnels having utility in collection of light from high energy particles and having a greater concentration capacity than imaging systems have been proposed by the inventor and his collaborators in earlier publications i.e., *Review of Scientific Instruments*, Vol. 37, No. 8, pp 1094-5 (1966), ibid., Vol. 39, No. 3, pp 419–20 (1968), ibid., Vol. 39, No. 8, pp. 1217–8 (1968), and *J. Opt. Soc. Am.*, Vol. 60, No. 2, pp. 245–7 (1970). The inventor also noted the similarity between such funnels and the geometry of retinal cones in *J. Opt. Soc. Am.*, Vol. 61, No. 8, pp. 1120-1 (1971). Basically, the above publications dealt with proposals for "ideal", conical-shaped, light collectors which approach an $f$ number equal to 0.5, a physically unrealizable limit for lens systems. The field of acceptance of conical collectors therein proposed may be represented by a right circular cone having a gradually diminishing (over about 1°) external boundary cut-off.

SUMMARY OF THE INVENTION

According to the present invention a non-imaging system of exceptional efficiency is provided for the collection and concentration of electromagnetic energy. Comprehended by the invention are longitudinally extending, generally trough-shaped collection structures including opposed inner reflective surfaces which function to guide and concentrate radiant energy impinging upon a relatively large entrance opening toward — and if desired, through — a relatively small exit opening at which there may be disposed a trap for detection or utilization of the concentrated energy. Preferred embodiments of the structures of the present invention possess an elliptical conical field of acceptance exhibiting an extremely sharp external boundary cut-off.

It is contemplated that embodiments of the present invention may be most effectively employed in the collection and utilization of solar energy to provide for high energy concentration (and hence achievement of high temperatures and optimal energy conservation) with minimal solar tracking.

Further aspects and advantages of the present invention will become apparent upon consideration of the following description thereof, reference being made of the following drawing.

BRIEF DESCRIPTION OF THE DRAWING

FIG. 12 is a graphic representation of relative solar motions.

FIG. 13 is a variant form of FIG. 12.

FIG. 14 is a graphic representation of the acceptance of a collector of the invention in terms of optical direction cosines.

FIG. 15 is a graphic representation of relative solar motion compared to the field of acceptance of a collection trough of the present invention.

FIGS. 17–19 are schematic views of radiant energy collectors of the present invention.

DETAILED DESCRIPTION

Figure 1:
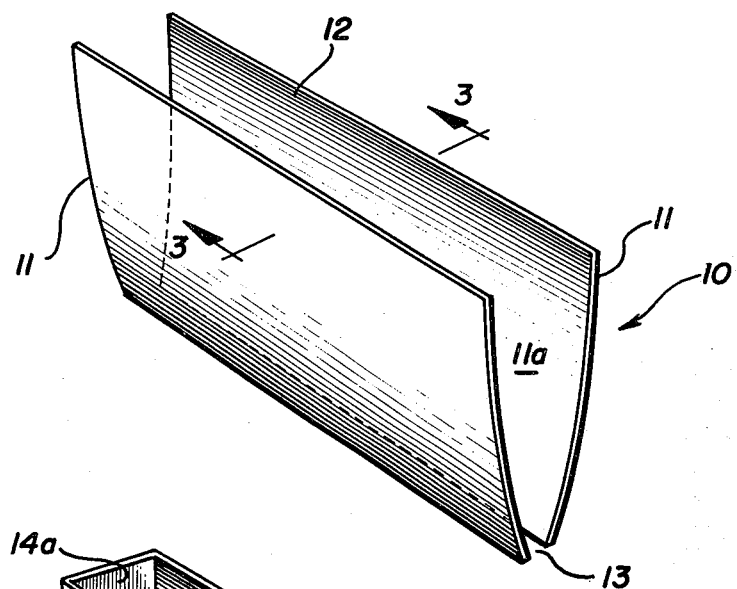
FIGS. 1 and 2 are schematic representations of radiant energy collection troughs of the present invention.
Figure 2:
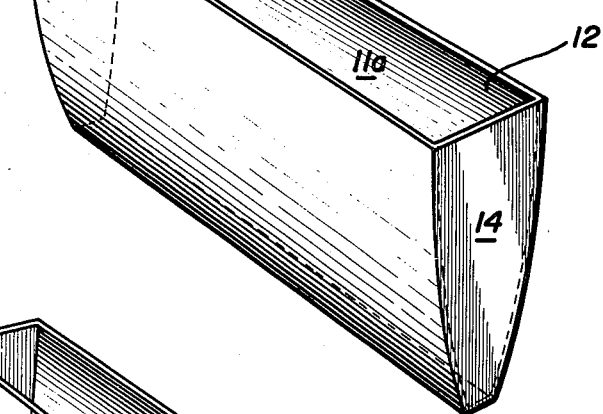

FIG. 1 illustrates an embodiment of an electromagnetic energy collector of the present invention including a generally trough-shaped body 10 having longtidiunally extending, substantially parallel, geometrically similar side wall elements 11, 11, the inner surfaces 11a, 11a of which are of energy reflective material. As shown, wall elements 11, 11 taper from an entrance aperture 12 to an exit aperture 13. FIG. 2 illustrates a similar structure including end wall elements 14, 14 which preferably extend from opening 13 to opening 12 and preferably also have energy reflective inner surfaces 14a, 14a. As discussed in greater detail later, provision of reflective side wall elements results in donation of optical properties approximating provision of a trough of infinite length.

Figure 3:
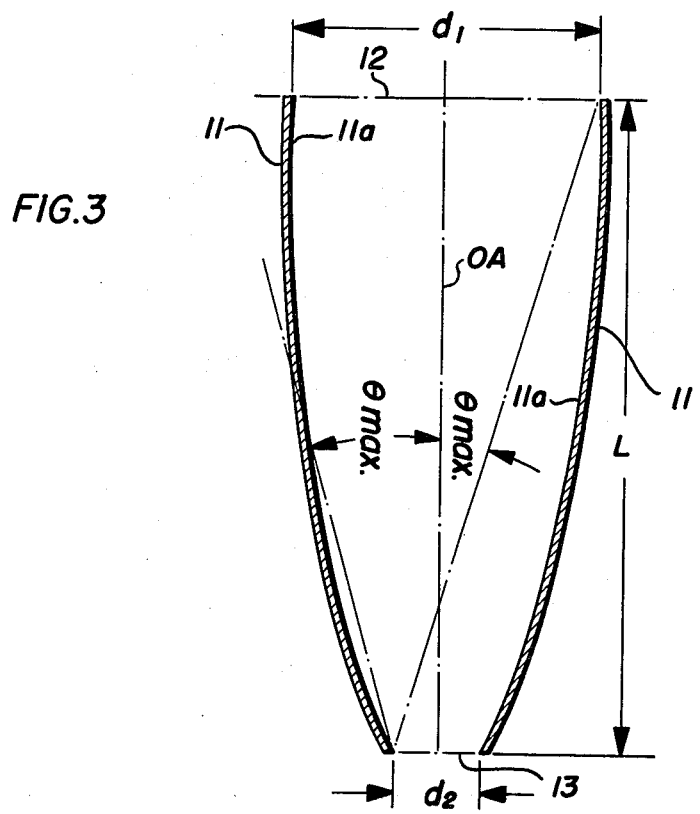
FIG. 3 is a transverse sectional view taken along line 3—3 of FIG. 2.
Figure 4:
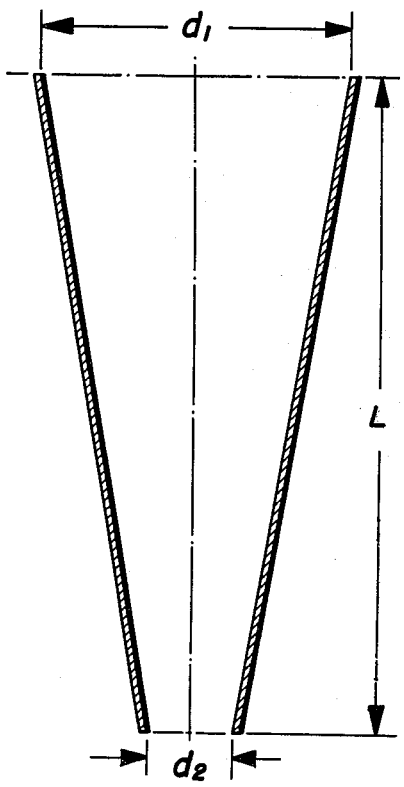
FIG. 4 is a transverse sectional view of a straight sided collection trough.
Figure 5:
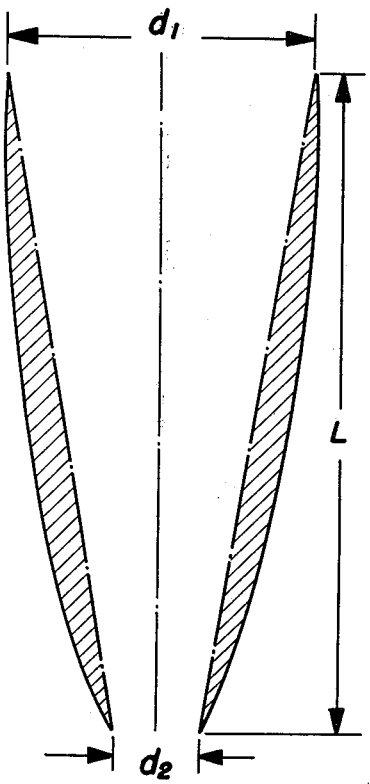
FIG. 5 is a composite transverse sectional view of collection troughs including troughs of the invention.

The optical properties of collectors of the type shown in FIGS. 1 and 2 are best illustrated through consideration of FIGS. 3, 4 and 5. In FIG. 3 a preferred embodiment of a collector of the present invention is seen to have an entrance aperture of a transverse dimension $d_1$, an exit aperture of a transverse dimension $d_2$, overall height L, an optical axis designated OA, and a half field of view, designated $\theta$. The optical axis of the trough is defined by a line extending from the entrance aperture to the exit aperture, all points of which are equidistant from respective opposed edges of each of said apertures. The half field of view of the trough of FIG. 3 is defined for the purposes of the present invention as the angle formed by the intersection of the optical axis and a straight line connecting an edge of one aperture with the laterally opposed edge of the other.

A property common to all collectors of the invention is the collector's "field of acceptance" which is defined as that three dimensional field from within which radiant energy (rays) impinging upon a given point in the plane of the collector entrance aperture will reach the exit aperture either directly or by way of one or more reflections from the collector reflective surfaces. Put another way, rays generated within the field of acceptance of a collector and reaching the entrance plane will invariably reach the exit aperture and those rays generated outside the field will not.

For the purposes of the present invention, the shape of a wall element 11 as revealed by the transverse cross sectional view of the collector 10 will be shown as the "profile curve" of the element. Accordingly, the profile curve of a side wall element of a collector constructed according to the present invention may, for example, be any substantially smooth, non-convex line (connecting laterally corresponding edges of exit and entrance apertures) falling within the shaded area of FIG. 5. It may be noted that the shaded area has as its boundary but does not include a straight line as illustrated in the collector of FIG. 4. An included parabolic line as shown in the embodiment of FIG. 3 forms the other boundary and is described in greater detail hereafter. Concave curving lines of length greater than that of the above-mentioned parabolic line are also contemplated.

The profile curve of a much preferred embodiment of a collector of the invention is shown in FIG. 3. The following aspects of that embodiment are of particular interest in understanding the invention.

1. The concentrative capability of the collector, i.e., the ratio of exit aperture transverse dimension $d_2$ to entrance aperture transverse dimension $d_1$, is equal to the sine of the half field of view ($\theta$) of the trough.

2. The height, L, of the collector is equal to one-half the sum of $d_1$ and $d_2$ multiplied by the cotangent of the half field of view.

3. The profile curve of each wall element is a section of a parabola having as its focus the laterally opposed edge of the exit aperture and as its axis a line forming an angle with the optical axis of the trough equal to the half field of view ($\theta$) of the trough.

Figure 6:
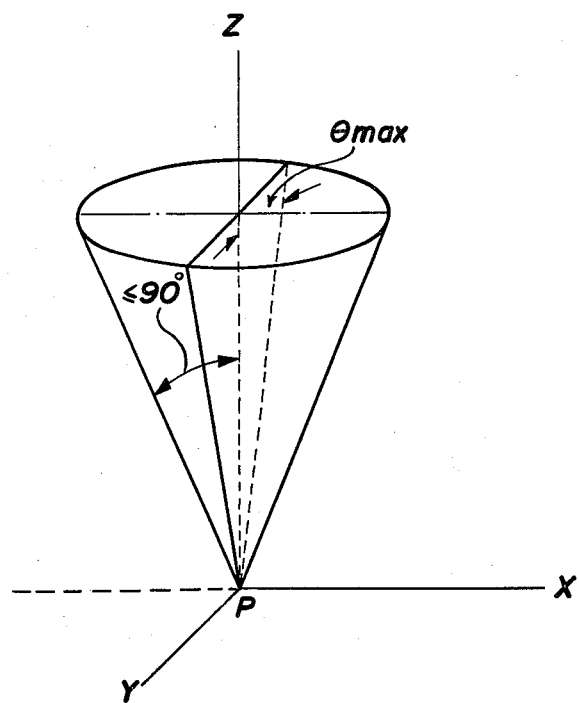
FIG. 6 is a graphic representation of the field of acceptance of a collection trough as shown in FIGS. 1–3.

4. The embodiment accepts for concentration all energy deriving from within an average elliptical conical field of acceptance developed by the geometric accumulation of all elliptical conical field of acceptance at all points within the plane of the entrance aperture, the parameters of each of said several fields being as follows (See FIG. 6):

a. The apex of the cone is any point, P, in the plane of the entrance aperture;

b. The axis of the cone is a line parallel to the optical axis of the trough;

c. The semi-minor axis of the cone is in a direction transverse to the trough and subtends an angle equal to the half field of view ($\theta$) of the trough; and d. The semi-major axis extends in the longitudinal direction of the trough and subtends an angle approaching 90° (as the trough approaches infinite length).

It will be noted that since the semi-major axis of the field of acceptance at any point, P, approaches 90° for a collector of infinite length, and since provision of reflective end walls donates optical properties approximating provision of an infinitely long trough, a cross section (taken parallel to the plane of the entrance aperture) of the average field of acceptance of a collector as in FIG. 2 approximates the shape of an infinitely long rectangular strip. It follows that the area of a sphere of unit radius intercepted by this field of acceptance (the solid angle in steradians) approaches four times the half field of view ($\theta$), provided the angle $\theta$ is measured in radians (one radian being approximately 57.3°.

It is especially noteworthy that the field of acceptance of the embodiment is identical at each and every point, P, in the plane of the entrance aperture. This being the case, the field of acceptance is not subject to failure or diminution at the edges of the collector trough and the maximum angle of acceptance within the field of acceptance is measured in a plane transverse to the collector, i.e., the angular acceptance of the entrance aperture, $\theta_{max}$, of the collector is quantitatively equal to the angle of the half field of view ($\theta$).

Another property of interest in the embodiments of FIGS. 1–3 is that radiant energy in the plane transverse to the trough which impinges at angles less than but closely approximating $\theta_{max}$ with respect to the optic axis are transmitted to the exit aperture with one or no reflections.

Further illustrative of such a collector's properties is the comparison of its efficiency to that of a perfectly absorbing flat surface for isotropic radiant energy impinging on the entrance aperture at all angles up to 90° with respect to the optic axis. The ratio of energy per second per unit area accepted by the collector to the energy per second per unit area accepted by the absorbing surface is equal to the collector's concentrative capability (the ratio of exit aperture width, $d_2$, to entrance aperture width, $d_1$).

In practice, numerous departures from the dimensional relationships present in FIGS. 1–3 may be made in the construction of a collector which will yield satisfactory, albeit perhaps less than ideal, overall results. For example, it may be noted that in FIG. 3 side wall 11 terminates at a point wherein a line tangent to its parabolic curvature would lie parallel to the optical axis. It may be desirable in some embodiments to provide a truncated collection trough having a height less than that of the collector of FIGS. 1–3 and in such cases side wall 11 would terminate short of the above-mentioned point.

It may be expedient to increase the overall height of the collector by linearly extending reflective side walls 11a, 11a beyond the entrance aperture and parallel to the optic axis. Such virtual extension of the entrance aperture away from the exit aperture does not serve to alter the angular acceptance of the collector but may diminish the collector's efficiency because of resultant multiple reflections. It may further be expedient to provide linear "transition" reflective wall segments extending away from the edges of the exit aperture, either parallel to the optic axis or preferably tapering slightly outwardly, to accomodate transmission of rays passing through the exit aperture toward a photocell detector or the like.

Similarly, it is likely that a collector might be more economically fabricated in the form more closely approximating that illustrated in cross section in FIG. 4. As might be predicted from known two dimensional analyses of optical collection properties of right circular cones (see, e.g., Williamson, "Cone Channel Condenser Optics" *J. Opt. Soc, Am.*, Vol. 42, No. 10, pp. 712–15 (1952) and, White, "Cone Channel Optics" *Infrared Physics*, Vol. 5, pp. 179–85 (1965)), a considerably more diffusely defined field of acceptance exists for such a structure, owing to the fact that the maximum angle of acceptance for given points in the plane of the entrance aperture is subject to variance depending upon relative transverse distance from the optical axis of the trough. This fact may be best illustrated through consideration of the following hypothetical example.

EXAMPLE I

Assume the construction of a first collector according to FIGS. 1–3 wherein the ratio of $d_1$ to $d_2$ (and hence the concentration factor) is 9.6 and further that the half field of view equals approximately 6°. The height (L) of the collector would be a fixed dimension according to the relationship described above, i.e., $L = \frac{1}{2}(d_1 + d_2) \cot \theta_{max}$. The maximum angle of acceptance at all points in the plane of the entrance aperture would be equal to 6°. In particular, radiant energy impinging upon a point, $P_1$, near the outermost edge of the entrance aperture would reach the exit aperture if it impinged upon $P_1$ from an angle of less than about 6° in either direction measured transversely to the trough optical axis.

Assume further the construction of a second collector of the form illustrated in transverse section in FIG. 4 having dimensions $d_1$, $d_2$ and L identical to those first of the collector. The collector would, of course, provide the same theoretical concentration of isotropically impinging energy but the field from which energy could be gathered would be much less sharply defined. Energy impinging upon a point, $P_1$, near the outermost edge of the entrance aperture would be channeled to the exit aperture only if it impinged upon $P_1$ from an angle of less than about 1° measured transversely to the trough optical axis in one direction or less than about 11° from the opposite direction.

Figure 7:
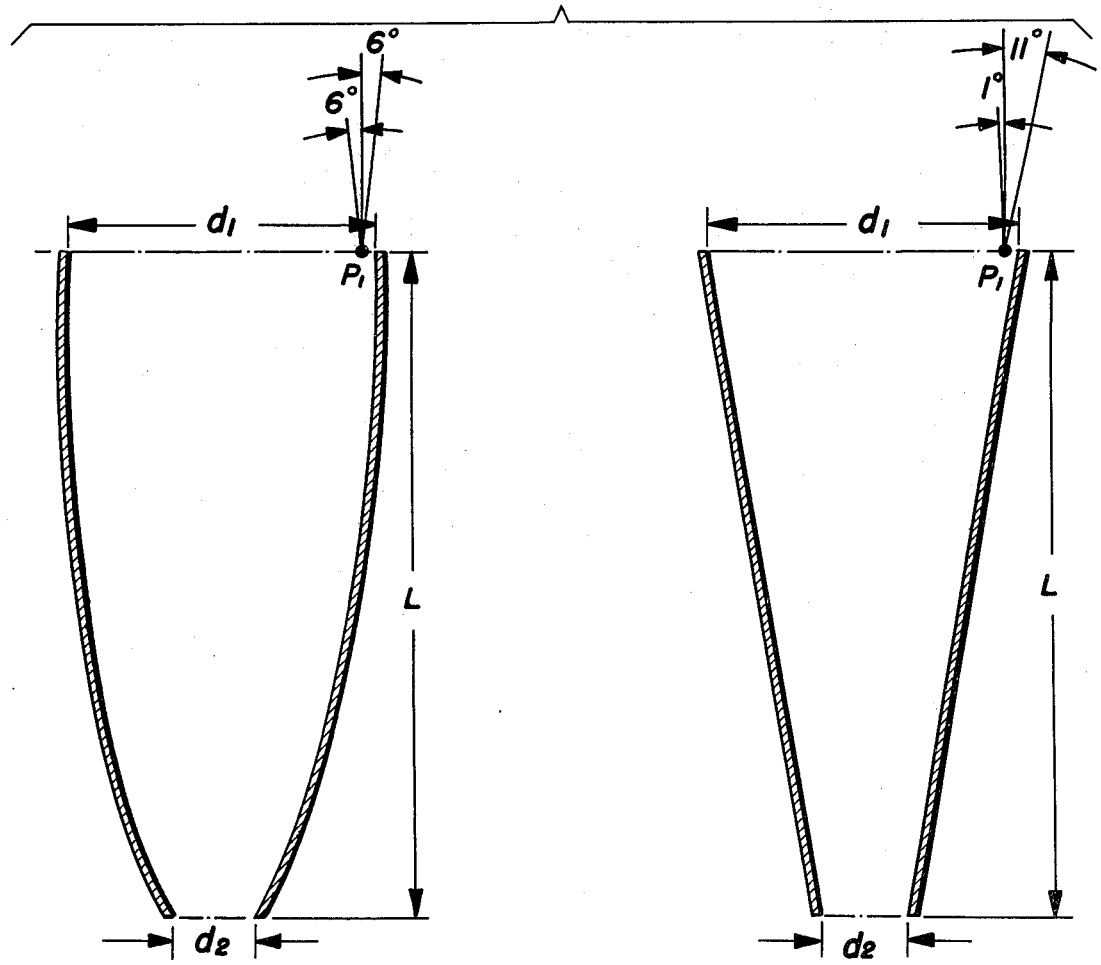
FIG. 7 is a comparative graphic representation of relative fields of acceptance.

Use of straight or substantially straight side wall elements as in FIG. 4 would give rise to acceptance of energy from marginal angles only after multiple reflections with consequent energy loss due to absorption by less than ideally reflective surfaces. The above example is schematically illustrated in FIG. 7.

While collection troughs of the invention preferably include smoothly curving side walls, it is anticipated that some economic advantage in fabrication might be derived through use of walls having one or more segments revealed in profile curve as straight lines.

Figure 9:
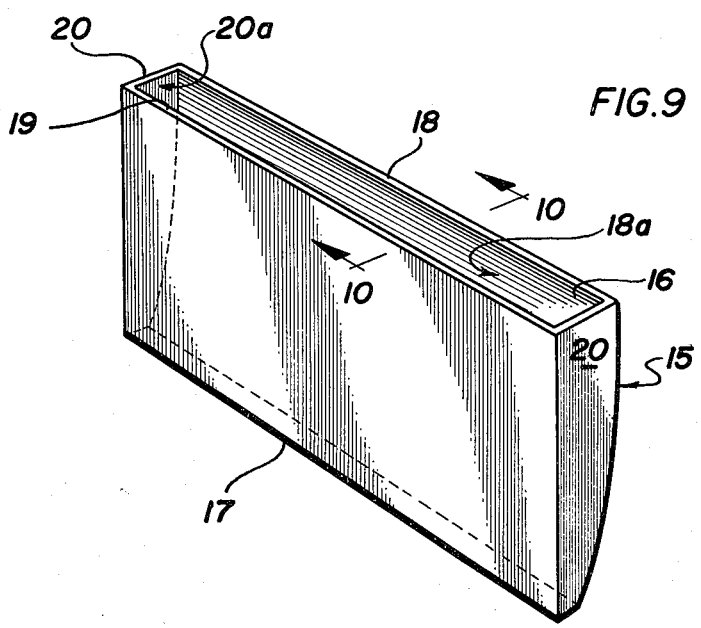
FIG. 9 is a schematic representation of another alternative embodiment of the invention.
Figure 10:
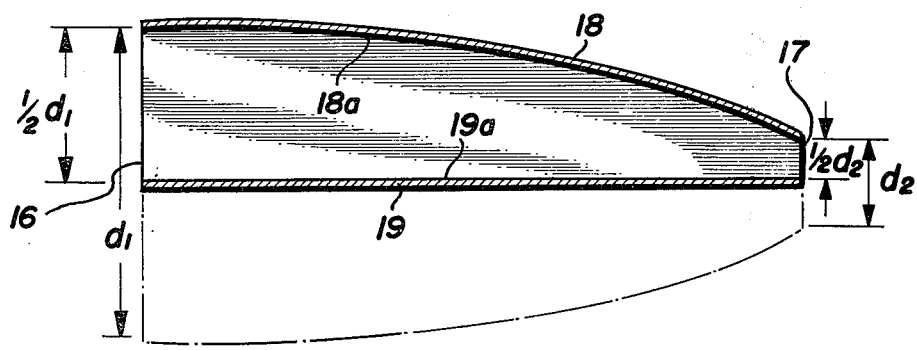
FIG. 10 is a sectional view taken along line 10—10 of FIG. 9.

It is contemplated that space limitations may develop special utility for "half trough" structures as illustrated in a preferred embodiment by FIGS. 9 and 10 wherein the trough body 15 includes entrance and exit apertures 16 and 17, respectively, along with inwardly tapering side wall element 18, a straight wall element 19 and, preferably, end wall elements 20, 20. Inner wall surfaces 18a, 19a and 20a would be radiant energy reflective. In the embodiment illustrated, dimensional relationships maintained in fabrication are similar to those employed in construction of an embodiment according to FIG. 1–3, with expected modifications, i.e., entrance and exit apertures have one half the transverse dimension, the half angle of view is the same, the length is the same, the reflective surface 19a of wall element 19 lies along what would be the optical axis of a "full trough," the focus of the parabolic curvature of the side wall 18 is at what would be the opposite edge of the exit aperture for a "full trough" (shown in phantom lines), the axis of the parabola would form an angle with the optic axis equal to the half field of view and average field of acceptance would be an elliptical cone approaching an infinitely long rectangular strip in transverse cross section for an infinetely long collector.

Figure 8:
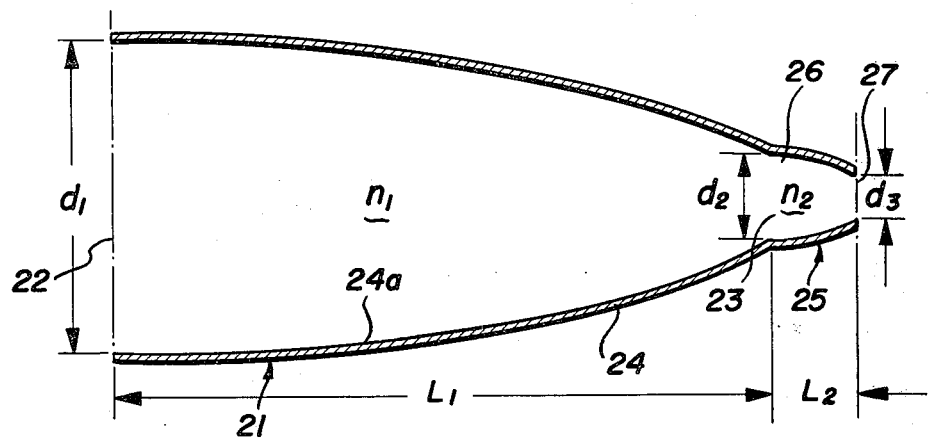
FIG. 8 is a cross sectional view of an alternative embodiment of the invention.

FIG. 8 illustrates in cross section a tandem trough collector which, under circmumstances hereafter described, may provide greater factors of concentration than provided by a single trough. In the embodiment shown, there is a first trough 21 having respective entrance and exit apertures 22 and 23, as well as side wall elements 24, 24 having energy reflective inner surfaces 24a, 24a. Contiguous to exit aperture 23 is a second trough 25 having an entrance aperture 26 of transverse dimension equal to aperture 23 and an exit aperture 27, as well as side wall elements 28, 28 having energy reflective inner surfaces 28a, 28a. Trough 21 is filled with a medium having a refractive index, $n_1$ (e.g. air, which has a refractive index of approximately 1.0), and trough 25 is filled with a material having a refractive index, $n_2$, greater shown than $n_1$ (e.g., lucite, which has a refractive index of approximately 1.5).

in understanding the operation of the embodiment of FIG. 8, it should be noted that an energy concentrator of the type of collector FIGS. 1–3 functions in part to reflect energy from within the collector's field of acceptance to the exit aperture. In practice, some energy will directly reach the exit aperture at an angle parallel to the optic axis of the collector while, at the opposite extreme, some energy will reach the plane of the exit aperture at a grazing angle of nearly 90°. To further concentrate such grazing energy toward a tandem second collector exit aperture requires both the refractive capacity of a medium greater index of refraction than that filling the first collector and an angular field of acceptance for the second collector equal to the critical angle of its medium. With this in mind, the operation of a tandem collector will be best understood through consideration of the following hypothetical example.

EXAMPLE II

Assume one wished to concentrate radiant energy to the longitudinally-extending photoelectric surface of an instrument having a transverse dimension $d_3$, equal to 1 inch. Assume further that one wished to concentrate energy from an angular field of acceptance of half angle equal to 16°. To accomplish such a result one might construct a single trough collector as shwon in FIGS. 1–3 filled with a medium having an index of refraction of 1. Since the exit aperture dimension is 1 inch and the desired maximum angle of acceptance is 16°, the entrance aperture transverse dimension and overall height of the trough may be derived from the relationships heretofore described i.e., the ratio of transverse exit aperture dimension to entrance aperture dimension equals the sine of the half field of view (which for the collector of FIGS. 1–3 equals the maximum angle of acceptance), and, the overall height of the collector equals half the sum of the entrance and exit aperture transverse dimensions multiplied by the cotangent of the half field of view. The transverse dimension of the entrance aperture would thus equal 3.6 inches. The concentration factor of the collector would be equal to 3.6.

One might instead construct a tandem trough collector as in FIG. 8 wherein the first trough 21 was filled with a medium having an index of refraction, $n_1$, of 1, the second trough 26 was filled with a second medium having an index of refraction, $n_2$, of 1.5 and the photoelectric surface was in optical contact with the second medium. The maximum angle of acceptance (critical angle) for trough 25 would be equal to the inverse sine of the index of refraction of the medium filling trough 21 divided by the index of refraction of the medium filling trough 26, i.e., $\theta_{max}$ = arc sine $n_1/n_2$ = arc sine 1/1.5 = arc sine 0.6666 = 42°. Given dimension $d_3$ of exit aperture 27 equal to 1 inch and maximum angle of acceptance equal to 42°, $d_2$, the transverse dimension of the entrance aperture 26 would be equal to 1.5 inches and the overall height would be 1.4 inches. With respect to trough 21, since the exit aperture 23 transverse dimension is equal to 1.5 inches and the desired maximum angle of acceptance is equal to 16°, the transverse dimension, $d_1$, of the entrance aperture 22 would be 5.4 inches and the overall height would be 12 inches. The concentration provided by trough 21 would be factor of 3.6 and the concentration of the entire tandem system would be equal to 1.5 times 3.6, or 5.4.

Finally, it may be noted that approximately the same concentration may be derived through use of a single collector in optical contact with air ($n_1$ approximately equal to 1) at the entrance, but filled with a medium of $n_2$ = 1.5 and having $\theta_{max}$ equal to 10.6° and other dimensions according to the relationships above described.

According to another aspect of the invention, there are proposed systems for collection of solar energy which include radiant energy collector-concentrators as above described. The inherent attractiveness of directly using solar light to meet man's energy needs has motivated an intense search for practical solar power schemes. For most of these, it is necessary to concentrate the sun light by at least an order of magnitude in order to achieve high temperatures. This poses no problem in principle because the rays of sunlight are quite parallel (the half-angle $\theta_s$ subtended by the solar disk is only ≈¼°) provided one tracks the sun's location in the sky with an accuracy comparable to $\theta_s$. Because of the formidable technical problems associated with tracking to this precision, it would clearly be an enormous advantage if the required concentration was achievable by a relatively stationary collector, i.e., one requiring little or no diurnal movement. This possibility was, in fact, explored in Tabor, infra, and the disappointing conclusion was reached that the maximum possible concentration obtainable by a stationary collector was 3 or 4. This result has been generally accepted to the present time. However, Tabor's analysis was based on conventional imaging optics and pre-dated the inventor's more recent developments which showed that systems that collect light but do not image can achieve a greater concentration than imaging systems.

Inasmuch as it is desired to concentrate solar radiation with ground based collectors, it is convenient for the purposes of discussing solar tracking problems to adopt a "Ptolemaic" description of the sun's motion in the sky. To an adequate approximation, the apparent motion of the sun as viewed from a fixed point on earth, describes the cone depicted in FIG. 12. In this figure the X axis direction is along north, the Y axis direction along west and Z axis direction along the vertical. The cone axis is in the X, Z plane, inclined at angle λ, which is the latitude. The cone opening angle, α, is the angle between the earth's axis of rotation and the earth-sun direction. Since the earth's axis is inclined at an angle of approximately 23.5° with respect to the normal to the plane of its orbit (the ecliptic plane), the angle varies between the approximate limits 66.5° ≤ α ≤ 113.5° during the course of a year. Except at a time of equinox, when a α = 90° and the apparent solar path describes a great circle wherein the sun does not "rise" or "fall" in the vertical, the problem of collecting solar light is non-trivial and becomes most demanding at solstice (α = 90° ± 23.5°). Collection and concentration of solar light by high factors at the time of solstice for a reasonable fraction of the day, say 6 to 8 hours, may be considered the fundamental problem of solar collection. This is so because at such times the apparent "rise" or "fall" in the vertical requires following or tracking the solar disk "upwardly" about 12° within the three or four hours prior to its reaching the zenith (noon) position and "downwardly" about another 12° within 3 or 4 hours after its reaching the zenith position. Clearly, the stationary collector which would continuously accept direct solar radiation throughout the period of the above-mentioned ±12° excursion during the time before and after reaching the noon position, and which further was capable of high orders of concentration, approaches the ideal in solar energy collection. The extent to which collectors of the invention approach this ideal is set forth hereafter.

The acceptance of a collector as shown in FIGS. 1–3 may be described using optical direction cosines KX, KY, KZ (See FIG. 14) where, for a constant index of refraction, we may take $\vec{K}$ as the unit energy ray direction. KX, KY become ture Hamiltonian variables conjugate to X, Y when the light ray trajectories are parameterized by Z. Here, Z is measured along the optic axis of the collector. Hence
$\int dXdY\ dKXdKY$ is conserved
Z = constant
In deriving the acceptance of such trough collectors in the KX, KY plane, the ray trajectories projected on a constant $\gamma$ plane behave as though the collector were two dimensional, so that
$KX^2/(KX^2 + KZ^2) \leq Sin^2\theta_{max}$
however,
$KX^2 + KY^2 + KZ^2 = 1$, so that
$KX^2/(1 - KY^2) \leq Sin^2\theta_{max}$
$KX^2/Sin^2\theta_{max} \leq 1 - KY^2$
$KX^2/Sin^2\theta_{max} + KY^2 \leq 1$
Thus the acceptance fills an ellipse of semi-minor axis equal to $Sin\theta_{max}$ and semi-major axis equal to 1, as shown in FIG. 14.

(It may be recalled at this point that the collector concentrates by a factor of $1/Sin\theta_{max}$ or cosec $\theta_{max}$.)

It is easily shown that the apparent motion of the sun in the KX, Ky plane is also an ellipse. A convenient way to visualize this is to reconsider FIG. 12 and take as the Z' direction the zenith (highest point of the sun in the sky, or noon) keeping the Y' direction West as before. (See FIG. 13).

Clearly, the projection of the cone on the X', Y' plane is an ellipse, and
$Sin\ 2\alpha \leq KX' \leq 0$
$Sin\alpha \leq KY' \leq Sin\alpha$, KY' = KY
or, in terms of $T = \pi/2 - \alpha$, $-Sin\ 2T \leq KX' \leq 0$, $-cosT \leq KY' \leq cosT$. Hence, the semi-minor axis = $a = \frac{1}{2} Sin2\alpha = \frac{1}{2} Sin2T$ and the semi-major axis = b = $Sin\alpha = cosT$.

FIG. 15 shows the ellipse described by the sun on a solstice, the most difficult period for collection. On the same figure has been added the acceptance of a $Sin\theta_{max} = 0.1$ collector which concentrates the sunlight by a factor 10. Clearly, such a collector accepts most of the useful day (7 to 8 hrs.) at solstice. More rigorously, one must choose the Z' axis to place the origin in the KX', KY' plane at the center of the collector ellipse. One then finds that for the solar ellipse
$<Sin\ (2T + \theta_{max}) \leq KX' \leq Sin\ \theta_{max}$,
$-CosT \leq KY' \leq CosT$
Hence,
$a = \frac{1}{2}[Sin(2T + \theta_{max}) + Sin\theta_{max}]$
$b = cosT$
Introducing a phase angle $\phi$ for the solar ellipse, where $\phi = 2\pi$ (=360°) corresponds to the 24 hour day, we find that at the intersection of the two ellipses $Cos\phi = [a^2 - 2a\ Sin\ \theta_{max} + (b\ Sin\ \theta_{max})^2]/[a^2 - (b\ Sin\ \theta_{max})^2]$. Therefore, the accepted number of daylight hours is given by Number of hours $= 2(\phi/2\pi)(24) = (\phi/\pi)(24)$ where the factor 2 results from the fact that $Cos\phi$ is even in $\phi$. Table I below approximates the number of accepted hours per day for a collector with $\theta_{max} = 6°$ (concentration factor, 9.6) throughout the year in the approximation of a point-like sun.

TABLE I

| Season | 2T | Cos Φ | Φ | Collected hours per day |
|---|---|---|---|---|
| Equinox | 0 | (Full Solar Ellipse Accepted) | | Full Daylight |
| | 15° | 0.37 | 68° | 9 |
| | 30° | 0.57 | 55° | 7.4 |
| Solstice | 47° | 0.61 | 52.4° | 7.0 |

Averaged over the year this gives approximately 8 hours of collected sunlight. For $\theta_{max} = 7°$ (concentration factor of 8.2) one may obtain an average day of approximately 9 hours of sunlight.

Use of concentrator as in FIG. 8 which includes tandem trough collectors wherein $n_1$ equals 1 and $n_2$ equals approximately 1.5 would result in achieving concentration factors on the order of 12 to 15.

Table II, below illustrates approximate concentration factors for collectors having $\theta_{max}$ within the range of ½° to 7° along with approximate totals of hours of sunlight which may be collected at solstice (2T=47°) in the approximation of a point-like sun.

TABLE II

| $\theta_{max}$ | 2T | CosΦ | Φ | Concentration Factor | Hours Collected |
|---|---|---|---|---|---|
| 7° | 47° | 0.567 | 55.5 | 8.2 | 7.4 |
| 6° | 47° | 0.610 | 52.4 | 9.6 | 7.0 |
| 5° | 47° | 0.657 | 48.9 | 11.4 | 6.5 |
| 4° | 47° | 0.709 | 44.8 | 14.3 | 6.0 |
| 3° | 47° | 0.769 | 39.8 | 19.1 | 5.3 |
| 2° | 47° | 0.835 | 33.4 | 28.6 | 4.4 |
| 1° | 47° | 0.912 | 24.2 | 57.3 | 3.2 |
| ½° | 47° | 0.954 | 17.4 | 114.6 | 2.3 |

It may be noted from the above that as the angular acceptance of the collector diminishes, the concentration factors increases and the number of hours of sunlight which can be collected at solstice decreases. This inherent property permits flexibility in solar energy collection to fit the requirements of a given environment or a given utilization scheme. Thus, when high temperatures are desired, it may be preferable to employ a small angular acceptance to achieve high concentration even though a lesser number of hours of sunlight might be collected at solstice without diurnal movement. Alternatively, it may be desirable to collect at lower concentration for a longer average period of time and in such a case a larger acceptance would be preferred.

It should also be noted that variations in the profile curve of collector side walls departing from that shown in FIG. 3 may give rise to diminished, though still advantageous, concentrative capacity for a given angular acceptance and/or diminished, though still advantageous, time spans for collection of direct sunlight at solstice and/or diminished, though still advantageous, total energy collection due to energy loss through multiple reflections.

Figure 11:
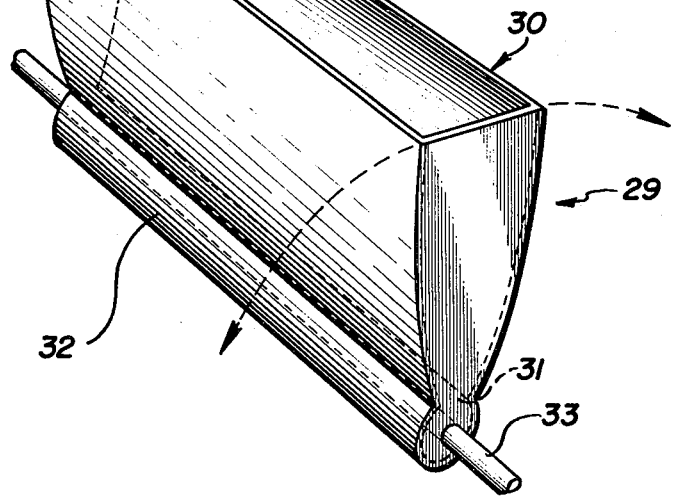
FIG. 11 is a schematic view of an embodiment of the invention useful in solar energy collection.
Figure 16:
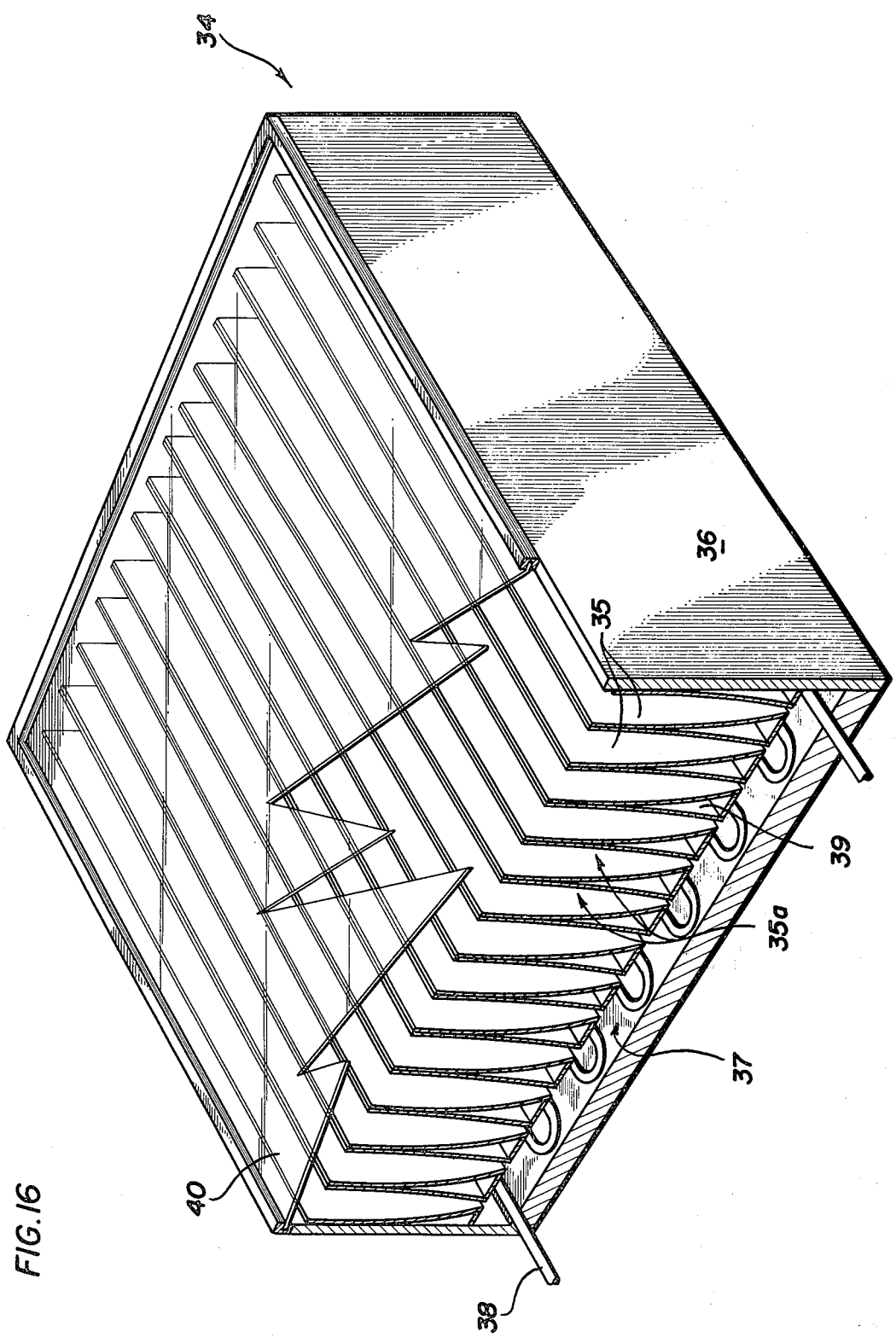
FIG. 16 is a schematic view of a solar energy collector of the present invention.

FIGS. 11 and 16 illustrate solar energy collection devices of the present invention which generally comprise one or more collector-concentrator troughs as in FIGS. 1–3 and a solar energy trap. As used herein, the term "trap" includes any apparatus having a capacity for accepting radiant energy of various wavelengths either for direct utilization of such energy or as an intermediate in such utilization. As such, the term includes, but is not limited to, such direct utilization devices as photo- and thermoelectric cells, as well as simple "black body" cavities and variant cavity structures such as are disclosed in the National Science Foundation publication NSF/RANN/SE/GI-34871/PR/72/4.

FIG. 11 shows a simple solar energy collector 29 with a collector-concentrator 30 as in FIGS. 1–3 having contiguous to its exit aperture 31 a generally cylindrical energy receiving body 32 with coaxial pipe 32 disposed therein. Pipe 33 may, for example, contain a fluid to be heated by energy transmitted into cylinder 31 through concentrator 30. It is proposed the collector 29 may be disposed to extend longitudinally in an east-west direction and that suitable means (not shown) may be employed to rotate concentrator 30 and cylinder 31 about pipe 33 for seasonal tracking of solar movement without disturbing the orientation of pipe 33.

FIG. 16 illustrates a solar energy collector 34 including a plurality of longitudinally-extending troughs 35 in edge to edge relationship within a box frame element 36. In the enclosed space 37 beneath troughs 35 is disposed a coil element 38 in which a fluid may circulate for utilization of heat energy entering space 37 from troughs 35. Box frame element 36 is preferably mounted with troughs 35 extending in an east-west direction and the entire frame may be moved for seasonal tracking of solar movement.

It will be noted that for ease of fabrication it may be desirable to construct the trough inner side wall elements in the manner shown, i.e., generally triangular elements 39 may be formed by extrusion (either of reflective material such as aluminum or of a plastic material later coated with a reflective material) to provide side wall surfaces 35a for adjacent troughs. A film 40 of a transparent material such as glass may be disposed above troughs 35 for the purpose of protecting trough inner side wall surfaces 35a from dust and the like. Due to known selective reflective properties (greenhouse effect), the use of an iron-free glass film may be particularly advantageous in selectively preventing re-radiation of infrared energy by reflecting a portion of re-radiated infrared back toward its exit aperture source.

FIGS. 17–19 illustrate concentration devices useful in collection of radiant energy deriving from within fields having a given angularity in one direction and a differing angularity in another. FIG. 17 (shown in cross section in FIGS. 18 and 3) shows, for example a trough 42 of a configuration similar to that of FIG. 2, but wherein end wall elements 43, 43 extend linearly from entrance aperture 44 for a given distance and then taper toward exit aperture 45 to reveal a partially linear and partially parabolic profile curve (See FIG. 18). FIG. 19 (shown in cross section in FIGS. 18 and 3) shows a collector of a shape analogous to that of an elliptic paraboloid but including parabolic inner surfaces defined according to the relationships set forth above with respect to FIGS. 1–3.

Obviously many modifications and variations of the invention will occur to those of ordinary skill in the art and therefore only such limitations as appear in the appended claims should be applied thereto.

What is claimed is:

1. A non-imaging radiant energy concentrator, said concentrator comprising:
   a trough-shaped body having,
   a longitudinally extending radiant energy entrance aperture with first and second opposing edges separated by a transverse distance $d_1$,
   a longitudinally extending radiant energy exit aperture, disposed opposite said entrance aperture, with first and second opposing edges separted by a transverse distance $d_2$,
   a pair of symmetrical substantially concave radiant energy reflecting and guiding side wall means interconnecting laterally corresponding edges of said apertures,
   a field of acceptance for radiant energy,
   an angular acceptance for radiant energy within said field of acceptance and determinable at said entrance aperture, and,
   an optical axis determinable by reference to distances separating entrance and exit aperture opposing edges,
   wherein the ratio of the distances $d_2$ to $d_1$ is no less than the sine of said angular acceptance, the profile curve of each of said wall means is a parabola having as its parabolic focus the opposing edge of said exit aperture and as its parabolic axis a line forming an angle with said optical axis of said body numerically equal to said angular acceptance, and the field of acceptance of the body, when represented in terms of optical direction cosines, is an ellipse of semi-minor axis equal to the sine of said angular acceptance and semi-major axis substantially equal to one.

2. A concentrator according to claim 1 wherein the distance separating said apertures is no more than one half the sum of $d_1$ and $d_2$ multiplied by the cotangent of said angular acceptance.

3. A concentrator according to claim 1 further including trough end wall means enclosing the space between by said energy reflecting and guiding side wall means.

4. A concentrator according to claim 3 wherein said end wall means are radiant energy reflective.

5. A concentrator according to claim 1 wherein said trough is filled with a medium having an index of refraction greater than 1 and said entrance aperture is in optical contact with a medium having an index of refraction lesser than that of the medium filling said trough.

6. A concentrator according to claim 1 further including a second such trough-shaped body disposed contiguous to said exit aperture, the transverse distance separating first and second edges of the entrance aperture of said second trough body being identical to the transverse distance separating first and second edges of said exit aperture.

7. A concentrator according to claim 6 wherein said trough is filled with a medium having a given index of refraction, said second trough is filled with a medium having an index of refraction greater than that of the medium filling said trough, and the angular acceptance for energy rays entering the second trough is the inverse sine of the ratio of the index of refraction of the medium filling the first trough to the index of refraction of the medium filling the second trough.

8. A non-imaging radiant energy concentrator, said concentrator comprising:
   a trough-shaped body having,
   a longitudinally extending radiant energy entrance aperture with first and second opposing edges separated by a transverse distance $d_1$, a longitudinally extending radiant energy exit aperture disposed opposite said entrance aperture with first and second opposing edges separated by a transverse distance $d_2$, a linear radiant energy reflecting and guiding side wall means interconnecting laterally corresponding first edges of said apertures, a substantially concave, curving radiant energy reflecting and guiding side wall interconnecting laterally corresponding second edges of said apertures, a field of acceptance for radiant energy, an angular acceptance for radiant energy within said field of acceptance and dterminable at said entrance aperture, and, an optical axis determinable by reference to distances separating entrance and exit aperture opposing edges, wherein the ratio of the distances $d_2$ to $d_1$ is no less than the sine of said angular acceptance, the profile curve of said curving wall means is a parabola having as it parabolic focus a point, in the plane of said exit aperture, spaced away from said first edge of said exit aperture a distance equal to $d_2$ and as its parabolic axis a line forming an angle with said optical axis of said body numerically equal to said angular acceptance, and the field of acceptance of the body, when represented in terms of optical direction cosines, is an ellipse of semiminor axis equal to the sine of said angular acceptance and semi-major axis substantially equal to one.

9. A concentrator according to claim 8 wherein the distance separating said apertures is no more than one half the sum of $d_1$ and $d_2$ multiplied by the cotangent of said angular acceptance.

10. A concentrator according to claim 8 further including trough end wall means enclosing the space between said wall means.

11. A concentrator according to claim 10 wherein said end wall means are radiant energy reflective.

12. Solar energy concentration apparatus, said apparatus comprising:
a concentrator element including,
a pair of longitudinally extending substantially parallel walls having substantially concave opposing inner solar energy reflecting surfaces,
each of said reflecting surfaces being sloped inwardly from an upper edge at an energy entrance aperture to a lower edge at an energy exit aperture, said exit aperture being of lesser transverse cross-sectional dimension than said entrance aperture,
a field of acceptance for solar energy and an angular acceptance within said field, determinable at said entrance aperture,
an optical axis determinable by reference to distances separating respective opposing upper and lower reflecting surface edges,
the profile curve of each of said reflecting surfaces being a parabola having as its parabolic focus the lower edge of the opposing reflecting surface and as its parabolic axis a line forming an angle with said optical axis numerically equal to the angular acceptance of the concentrator,
the dimensions of said apertures and the slope of said reflecting surfaces being such that said field of acceptance is capable of including an arc segment of coordinates equal to those described by the apparent motion of the sun within at least one hour before and after reaching zenith point at solstice; and,
a solar energy trap at said energy exit aperture.

13. Apparatus according to claim 12, wherein the height of said concentrator element is no more than one-half the sum of the transverse cross-sectional dimensions of said entrance and exit apertures multiplied by the cotangent of said concentrator angular acceptance.

14. Apparatus according to claim 12 wherein the ratio of the transverse cross-sectional dimensions of said concentrator element exit aperture to said entrance aperture is no less than the sine of said angular acceptance.

15. Apparatus according to claim 12 further including solar energy reflecting end wall means at the ends of said parallel walls of said concentrator element.

16. Apparatus according to claim 12 wherein said concentrator angular acceptance is 6°.

17. Apparatus according to claim 12 wherein said concentrator element is filled with a medium having an index of refraction greater than 1 and said entrance aperture is in optical contact with a medium having an index of refraction less than that of the medium filling said concentrator.

18. Apparatus according to claim 12 further including a second concentrator element geometrically similar to said concentrator element and disposesd between said concentrator element and said solar energy trap contiguous to said concentrator element exit aperture, the transverse cross-sectional distance separating opposing upper edges of said second concentrator element reflecting surfaces being identical to the transverse cross-sectional distance separating opposing lower edges of said concentrator element reflecting surfaces.

19. Apparatus according to claim 18 wherein said concentrator element is filled with a medium having a given index of refraction, said second concentrator element is filled with a medium having an index of refraction greater than that of the medium filling said concentrator element, and the angular acceptance for energy rays entering said second concentrator element is the inverse sine of the ratio of the index of refraction of the medium filling said concentrator element to the index of refraction of the medium filling said second concentrator element.

20. Solar energy concentration apparatus, said apparatus comprising:
a concentrator element including,
a pair of longitudinally extending substantially parallel walls having opposing inner solar energy reflecting surfaces,
one of said reflecting surfaces being substsantially concave and sloped inwardly from an upper edge at an energy entrance aperture to a lower edge at an energy exit aperture and the other of said reflecting surfaces extending linearly from an upper edge at said energy entrance aperture to a lower edge at said energy exit aperture, said exit aperture being of lesser transverse cross-sectional dimension than said entrance aperture,
a field of acceptance for solar energy and an angular acceptance within said field, determinable at said entrance aperture,
an optical axis determinable by reference to distances separating respective opposing upper and lower reflecting surface edges, the profile curve of said sloping reflective surface being a parabola having as its parabolic focus a point, in the plane of said exit aperture, spaced away from said linearly extending reflective surface lower edge a distance equal to said exit aperture transverse cross-sectional dimension and as its parabolic axis a line forming an angle with said optical axis of said concentrator numerically equal to said angular acceptance, the dimensions of said apertures and the slope of said sloping reflecting surface being such that the field of acceptance of said concentrator is capable of including an arc segment of coordinates equal to those described by the apparent motion of the sun within at least one hour before and after reaching zenith point at solstice; and, a solar energy trap at said exit aperture.

21. Apparatus according to claim 20 wherein the height of said concentrator elemenet is no more than the sum of the transverse cross-sectional dimensions of said entrance and exit apertures multiplied by the cotangent of said concentrator angular acceptance.

22. Apparatus according to claim 20 wherein the ratio of the transverse cross-sectional dimensions of said concentrator element exit aperture to said entrance aperture is no less than the sine of said angular acceptance.

23. Apparatus according to claim 20 further including solar energy reflective end wall means at the ends of said parallel walls of said concentrator element.

24. Apparatus according to claim 20 wherein said concentrator angular acceptance is 6°.

* * * * *

UNITED STATES PATENT OFFICE
CERTIFICATE OF CORRECTION

PATENT NO. : 3,923,381
DATED : December 2, 1975
INVENTOR(S) : Roland Winston

It is certified that error appears in the above-identified patent and that said Letters Patent are hereby corrected as shown below:

Col. 1, line 26, after "providing" insert -- selective --.
Col. 3, line 60, "shown" should be -- known --.
Col. 4, line 26, "field" should be -- fields --.
Col. 4, line 59, "is" should be -- as --.
Col. 6, line 67 delete "shown".
Col. 8, line 65, "the" should be -- a --.
Col. 9, line 18, "ture" should be -- true --.
Col. 9, line 45 and 46 before each line insert --  -  --, to designate the mathematical "minus" quantity.
Col. 9, line 60 "<" should be --  -  --.
Col. 10, line 42, "factors" should be -- factor --.
Col. 10, line 54, after "larger" insert -- angular --.
Col. 12, line 7, "separted" should be -- separated --.
Col. 12, line 20, "dl" should be -- $d_1$ --.
Col. 12, line 57, "refrection" should be -- refraction --.
Col. 13, line 14, "dterminable" should be -- determinable --.
Col. 14, line 54, "substsantially" should be -- substantially --.
Col. 16, line 2, "elemenet" should be -- element --.

Signed and Sealed this thirteenth Day of April 1976

[SEAL]

Attest:

RUTH C. MASON
Attesting Officer

C. MARSHALL DANN
Commissioner of Patents and Trademarks